United States Patent [19]

Champenois

[11] 4,240,959
[45] Dec. 23, 1980

[54] 1,2-DIALKYL-3-PHENYL-5-[4-(N-ALKYL OR N,N-DIALKYL)AMINO-2-BENZOYLAMINO-PHENYLAZO]PYRAZOLIUM DYESTUFFS

[75] Inventor: Michel M. L. Champenois, Le Mesnil Esnard, France

[73] Assignee: Produits Chimiques Ugine Kuhlmann, Courbevoie, France

[21] Appl. No.: 948,273

[22] Filed: Oct. 3, 1978

[30] Foreign Application Priority Data

Oct. 21, 1977 [FR] France .................... 77 31712

[51] Int. Cl.³ .................. C09B 29/08; C09B 45/22; D06P 3/70
[52] U.S. Cl. .................. 260/147; 260/162
[58] Field of Search ............ 260/146 R, 162, 163, 260/147

[56] References Cited

U.S. PATENT DOCUMENTS

| | | | |
|---|---|---|---|
| 3,515,715 | 6/1970 | Straley et al. | 260/163 |
| 3,948,878 | 4/1976 | Coispeau | 260/147 |
| 4,082,740 | 4/1978 | Mohr et al. | 260/146 R |
| 4,113,718 | 9/1978 | Loew et al. | 260/147 |
| 4,116,954 | 9/1978 | Coispeau et al. | 260/162 |

FOREIGN PATENT DOCUMENTS

| | | | |
|---|---|---|---|
| 2435919 | 2/1975 | Fed. Rep. of Germany | 260/162 |
| 1392581 | 2/1965 | France | 260/163 |
| 2184023 | 5/1972 | France | 260/163 |
| 7309743 | 1/1974 | Netherlands | 260/163 |
| 1388290 | 3/1975 | United Kingdom | 260/163 |
| 1480376 | 7/1977 | United Kingdom | 260/163 |

*Primary Examiner*—Floyd D. Higel
*Attorney, Agent, or Firm*—Beveridge, DeGrandi, Kline & Lunsford

[57] ABSTRACT

The present invention relates to new azo-pyrazolium dyestuffs which correspond to the general formula:

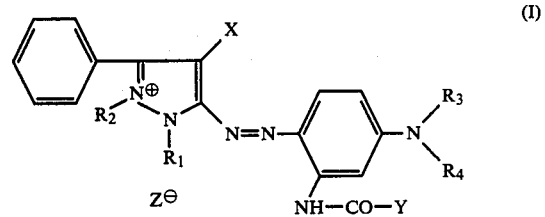

(I)

in which $R_1$ and $R_2$ represent alkyl groups containing 1 to 4 carbon atoms, $R_3$ represents a hydrogen atom or a methyl or ethyl group, $R_4$ represents a methyl or ethyl group, X represents a hydrogen atom or a nitro group, Y represents a phenyl group or said phenyl group substituted by one or two halogen atoms or nitro groups, and Z represents an anion. These dyestuffs, which have a mean index of compatibility and are stable in dyebaths, provide on acrylic fibers red colorations of a pure shade having excellent fastness (light, vaporizing, washing).

4 Claims, No Drawings

1,2-DIALKYL-3-PHENYL-5-[4-(N-ALKYL OR N,N-DIALKYL)AMINO-2-BENZOYLAMINO-PHENYLAZO]PYRAZOLIUM DYESTUFFS

The present invention relates to new azo-pyrazolium dyestuffs which may be used for the coloration of fibers based on polymers or copolymers of acrylonitrile and other fibers modified to be dyeable with basic dyestuffs.

Users of dyestuffs have been increasingly requesting that the index of compatibility of the dyestuffs be a mean index. The index of compatibility which is defined in the Journal J.S.D.C. of February 1971 is a measurement which characterizes the associability of a dyestuff in combination, whatever may be the process of dyeing used; when dyestuffs with an equal index of compatibility are used in combination, their uptake is shown in the tone of the final shade.

In the French Pat. Nos. 2,240,269 and 2,152,385, azopyrazolium dyestuffs have been described which dye the aforesaid fibers in bright and clear red shades. However, these dyestuffs generally have a weak index of compatibility or are not always sufficiently stable in the dyebaths.

There has now been found by applicant a new series of azo-pyrazolium dyestuffs which provides on the above-mentioned fibers red colorations of a pure shade having excellent fastness (light, vaporizing, washing). These dyestuffs, which have a mean index of compatibility and are stable in dyebaths, correspond to the general formula:

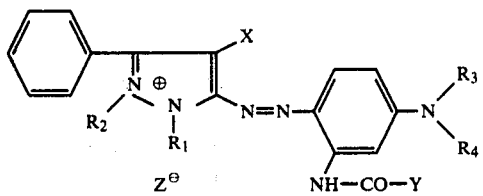

in which $R_1$ and $R_2$ represent alkyl groups containing 1 to 4 carbon atoms, preferably methyl or ethyl groups, $R_3$ represents a hydrogen atom or a methyl or ethyl group, $R_4$ represents a methyl or ethyl group, X represents a hydrogen atom or a nitro group, Y represents a phenyl group or said phenyl group substituted by one or two halogen atoms (Cl, Br, I or F) or nitro groups, and $Z^\ominus$ represents an anion such as chloride, sulphomethylate, sulphoethylate, chlorozincate, acetate, nitrate, bicarbonate, or p.toluenesulphonate.

The dyestuffs of formula (I) may be prepared by treatment of compounds of the formula:

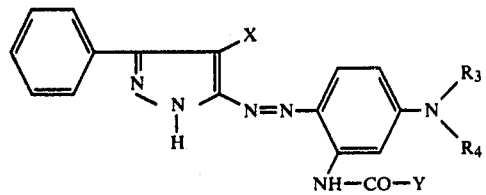

in which X, Y, $R_3$ and $R_4$ have the same significance as above, with alkylating agents according to processes known per se.

The alkylating treatment may be effected in an excess of alkylating agent or in an organic solvent such as benzenic hydrocarbons and their chlorinated derivatives, dimethyl formamide or chloroform. Examples of alkylating agents which may be used are the alkyl halides, alkyl arylsulfonates and dialkyl sulfates, especially the methyl or ethyl salts.

The compounds of formula (II) may be obtained in a known manner by coupling the diazo derivative of 5(3)-amino-3(5)-phenylpyrazole or 5(3)-amino-4-nitro-3(5)-phenyl-pyrazole with a compound of the formula:

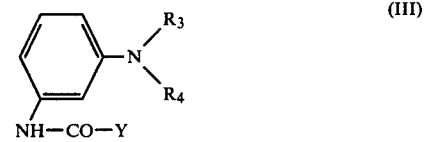

in which $R_3$, $R_4$ and Y have the same significance as above.

The diazotization of 5(3)-amino-3(5)-phenyl-pyrazole or its 4-nitro derivative is carried out in a known manner by the action of an alkali metal nitrite in a mineral acid and/or organic acid medium.

The coupling compounds of formula (III) may be obtained in a manner known per se by condensation of an N-alkyl or N,N-dialkyl metaphenylenediamine with benzoic acid chloride or said chloride substituted by one or two halogen atoms or nitro groups. The dyestuffs according to the present invention may be applied to fibers based on polymers or copolymers of acrylonitrile or fibers based on polyamides or polyesters modified by acid groups, according to all known methods of application of basic dyestuffs. The coloration is conferred by the dye cation; the anion plays no tinctorial role and can be exchanged for another anion, for example, in order to modify the solubility of the dyestuff.

Among the dyestuffs of formula (I), those of the formula:

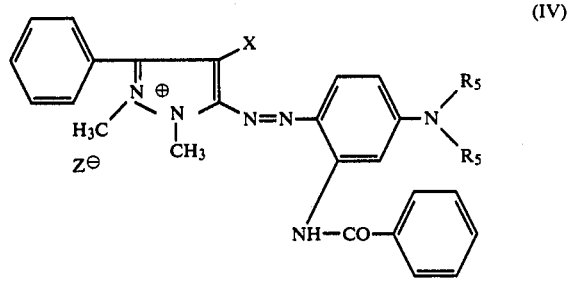

in which X and $Z^\ominus$ have the same significance as above and $R_5$ is methyl or ethyl, are particularly interesting.

In the following examples, to which the invention is not restricted, the parts indicated are parts by weight.

EXAMPLE 1

79.5 Parts of 3-phenyl-5-amino-pyrazole are dissolved in 500 parts of water acidified with 125 parts of glacial acetic acid. This solution is cooled to between 0° and 5° C. by addition of 200 parts of ice, and 220 parts of 96% sulfuric acid are added; the temperature rises to 15° C. 150 Parts of ice are added to cool, and then 37.5 parts of sodium nitrite in solution in 37.5 parts of water are rapidly run in. The temperature is maintained at 0° C. by addition of 150 parts of ice. The mixture is stirred for 10 minutes, then the solution of the diazonium salt obtained is filtered off. After neutralization of the excess nitrous acid with sulfamic acid, the solution of the diazo derivative is run in a period of one hour into a solution of 134 parts of N,N-diethyl-N'-benzoyl-metaphenylenediamine in 500 parts of water and 90 parts of 96% sulfuric acid, while maintaining the temperature at 0° C. by progressive addition of 200 parts of ice. Then the pH is slowly raised to about 4 by addition of 350 parts of 25% ammonia, and the precipitate is filtered off, washed with water and dried. 25 Parts of the 3-phenyl-5(2-benzoylamino-4-diethylamino-phenylazo)-pyrazole thus obtained are introduced into 90 parts of dimethyl sulfate and the mixture is heated at 90° C. until a sample taken is totally soluble in water. It is then left to cool to 60° C., then the solution is run onto 100 parts of water, stirred one-half hour at 60° C. and allowed to cool to the ambient temperature.

The dyestuff is precipitated by addition of sodium chloride and zinc chloride, filtered off and dried. The chlorozincate of 1,2-dimethyl-3-phenyl-5(2-benzoylamino-4diethylamino-phenylazo)-pyrazolium is thus obtained in the form of red powder, soluble in water; it gives a bright red solution. This dyestuff dyes fibers based on polymers or copolymers of acrylonitrile in a pure and bright red shade. Its index of compatibility (Ic), determined according to the method described in J.S.D.C. of February 1971, is 3.5 and its stability in the dyebaths is remarkable.

The following Table 1 illustrates other examples of dyestuffs according to the invention, prepared as in the preceding Example 1 from the same diazo derivative, but replacing the N,N-diethyl-N'-benzoyl-m-phenylenediamine by an equimolecular amount of the coupling component indicated in the second column.

TABLE 1

| Example | Coupling Component of formula (III) | Ic | Shade |
|---|---|---|---|
| 2 | N,N-dimethyl-N'-benzoyl-m-phenylenediamine | 3.5 | red |
| 3 | N,N-diethyl-N'-(4-nitro-benzoyl)-m-phenylenediamine | 2.5 | red |
| 4 | N,N-diethyl-N'-(3-nitro-benzoyl)-m-phenylenediamine | 3.5 | bluish red |
| 5 | N,N-diethyl-N'-(2-nitro-benzoyl)-m-phenylenediamine | 3 | bluish red |
| 6 | N,N-dimethyl-N'-(4-nitro-benzoyl)-m-phenylenediamine | 2.5 | red |
| 7 | N,N-dimethyl-N'-(3-nitro-benzoyl)-m-phenylenediamine | 3.5 | red |
| 8 | N,N-dimethyl-N'-(2-nitro-benzoyl)-m-phenylenediamine | 3 | red |
| 9 | N,N-diethyl-N'-(2-chlorobenzoyl)-m-phenylenediamine | 3 | bluish red |
| 10 | N,N-dimethyl-N'-(2-chlorobenzoyl)-m-phenylenediamine | 3 | red |
| 11 | N,N-diethyl-N'-(4-chlorobenzoyl)-m-phenylenediamine | 2.5 | bluish red |
| 12 | N,N-dimethyl-N'-(4-chlorobenzoyl)-m-phenylenediamine | 3 | red |
| 13 | N,N-diethyl-N'-(2,4-dichlorobenzoyl)-m-phenylenediamine | 3.5 | red |
| 14 | N,N-dimethyl-N'-(2,4-dichlorobenzoyl)-m-phenylenediamine | 3.5 | red |

EXAMPLE 15

On replacing in Example 1 the 3-phenyl-5-aminopyrazole by an equivalent amount of 3(5)-phenyl-4-nitro-5(3)-amino-pyrazole, the chlorozincate of 1,2-dimethyl-3-phenyl-4-nitro-5-(2-benzoyl-amino-4-diethylamino-phenylazo)-pyrazolium is obtained. This dyestuff dyes fibers based on polymers or copolymers of acrylonitrile in a bluish red shade; its index of compatibility is three and its stability in the dyebaths is remarkable.

The following Table 2 illustrates other examples of dyestuffs according to the invention, prepared as in the preceding Example 15 from the same diazo derivative, but replacing the N,N-diethyl-N'-benzoyl-m-phenylenediamine by an equimolecular amount of the coupling component indicated in the second column.

TABLE 2

| Example | Coupling component of formula (III) | Shade |
|---|---|---|
| 16 | N,N-dimethyl-N'-benzoyl-m-phenylenediamine | bluish red |
| 17 | N,N-diethyl-N'-(4-nitro-benzoyl)-m-phenylenediamine | bluish red |
| 18 | N,N-diethyl-N'-(3-nitro-benzoyl)-m-phenylenediamine | bluish red |
| 19 | N,N-diethyl-N'-(2-nitro-benzoyl)-m-phenylenediamine | bluish red |
| 20 | N,N-dimethyl-N'-(4-nitro-benzoyl)-m-phenylenediamine | bluish red |
| 21 | N,N-dimethyl-N'-(3-nitro-benzoyl)-m-phenylenediamine | bluish red |
| 22 | N,N-dimethyl-N'-(2-nitro-benzoyl)-m-phenylenediamine | bluish red |
| 23 | N,N-diethyl-N'-(2-chlorobenzoyl)-m-phenylenediamine | bluish red |
| 24 | N,N-dimethyl-N'-(2-chlorobenzoyl)-m-phenylenediamine | bluish red |
| 25 | N,N-diethyl-N'-(4-chlorobenzoyl)-m-phenylenediamine | bluish red |
| 26 | N,N-dimethyl-N'-(4-chlorobenzoyl)-m-phenylenediamine | bluish red |
| 27 | N,N-diethyl-N'-(2,4-dichlorobenzoyl)-m-phenylenediamine | bluish red |
| 28 | N,N-dimethyl-N'-(2,4-dichlorobenzoyl)-m-phenylenediamine | red |

What is claimed is:

1. Dyestuff of the formula:

[Chemical structure showing a pyrazolium ring linked via azo (N=N) to a phenyl ring bearing NH—CO—Y and N(R3)(R4) groups, with substituents X, R1, R2 and counterion Z⊖]

in which $R_1$ and $R_2$ represent alkyl containing 1 to 4 carbon atoms, $R_3$ represents hydrogen, methyl or ethyl, $R_4$ represents methyl or ethyl, X represents hydrogen or nitro, Y represents phenyl or phenyl substituted by one or two halogen atoms or nitro groups, and $Z^\ominus$ represents an anion.

2. The dyestuff according to claim 1 in which $R_1$ and $R_2$ are each methyl or ethyl.

3. The dyestuff according to claim 2 in which Y is phenyl, nitrophenyl, chlorophenyl or dichlorophenyl.

4. The dyestuff according to claim 1 in which Y is phenyl, nitrophenyl, chlorophenyl or dichlorophenyl.

* * * * *